United States Patent [19]

Wittry

[11] Patent Number: 5,622,149
[45] Date of Patent: *Apr. 22, 1997

[54] HIGH-POWER ROTARY ENGINE WITH VARAIABLE COMPRESSION RATIO

[76] Inventor: David B. Wittry, 1036 S. Madison Ave., Pasadena, Calif. 91106-4365

[ * ] Notice: The term of this patent shall not extend beyond the expiration date of Pat. No. 5,433,179.

[21] Appl. No.: 442,486

[22] Filed: May 15, 1995

Related U.S. Application Data

[63] Continuation-in-part of Ser. No. 161,227, Dec. 2, 1993, Pat. No. 5,433,179.

[51] Int. Cl.⁶ ..................................................... F02B 53/00
[52] U.S. Cl. ............................. 123/245; 123/202; 418/36
[58] Field of Search ............................ 418/36, 143, 180; 123/202, 245

[56] References Cited

U.S. PATENT DOCUMENTS

| 1,676,211 | 7/1928 | Bullington . | |
|---|---|---|---|
| 2,072,484 | 3/1937 | Myard . | |
| 2,085,505 | 6/1937 | Murakami | 418/36 |
| 3,144,007 | 8/1964 | Kauertz . | |
| 3,203,405 | 8/1965 | Sabet . | |
| 3,256,866 | 6/1966 | Bauer | 123/245 |
| 3,356,079 | 12/1967 | Rolfsmeyer . | |
| 3,396,634 | 8/1968 | LeBlanc . | |
| 3,592,571 | 7/1971 | Drury | 418/36 |
| 3,719,438 | 3/1973 | Howard | 418/36 |
| 3,801,237 | 4/1974 | Gotthold | 418/36 |
| 3,985,110 | 10/1976 | Doundoulakis | 418/36 |
| 4,010,716 | 3/1977 | Minka | 418/36 |
| 4,068,985 | 1/1978 | Baer | 418/36 |
| 5,133,317 | 7/1992 | Sakita | 418/36 |
| 5,147,191 | 9/1992 | Shadeck | 418/36 |

FOREIGN PATENT DOCUMENTS

| 1055004 | 3/1954 | France | 418/36 |
|---|---|---|---|
| 3022871 | 1/1982 | Germany | 418/36 |
| 519517 | 6/1936 | United Kingdom . | |
| 1123503 | 8/1968 | United Kingdom | 123/202 |
| 1155429 | 6/1969 | United Kingdom . | |

OTHER PUBLICATIONS

Zemansky, M. W. "Heat and Thermodynamics" McGraw Hill Book Co., 1943 pp. 120–123.
Norbye, J.P. "Rivals to the Wankel: A round–up of rotary engines" Popular Science, Jan. 1967, pp. 80–85.
Lichty, L.C., "Combustion Engine Processes" McGraw Hill Book Co., 1967 pp. 10–11.
chinitz, W. "Rotary Engines" Scientific American, vol. 220 No. 2, 1967 pp. 90–99.
Normile, D., "Mazda Meets Miller" Popular Science, Aug. 1993, p. 27.
Stone, R. "Introduction to Internal Combustion Engines" Soc. of Automotive Engineers, Warrendale, PA., 1993 pp. 50–54.

Primary Examiner—Charles G. Freay

[57] ABSTRACT

A rotary engine having two interdigitated rotors (FIGS. 1a, 1b, or 1c) each of which has two radial vanes dividing a cylindrical cavity in the liquid-cooled rotor housing (11 in FIG. 2) into four chambers. The rotors are coupled to a planetary gear system (FIG. 2 ) by connecting rods (19 and 29) to planet gears (22 and 32) that rotate about a fixed sun gear (27) having a diameter twice the diameter of the planet gears. During one revolution of the output shaft (25), which is connected to the planet gear cage (24), the rotors alternately speed up and slow down, causing the size of each of the four chambers to vary from a maximum size to a minimum size twice. As the chambers rotate about the axis of the cylindrical cavity, they pass an inlet port (13), outlet port (14) and ignition plug port (15) contained in the housing so that intake, compression, explosion and exhaustion occurs in each chamber for one revolution of the output shaft. A passageway (39) containing an adjustable, pressure-sensitive valve (40) vents the compression chamber to the intake chamber to allow the compression ratio to be varied and to provide [a compression] an expansion ratio that exceeds the [expansion] compression ratio.

29 Claims, 5 Drawing Sheets

HIGH-POWER ROTARY ENGINE WITH VARAIABLE COMPRESSION RATIO

This is a continuation-in-part of Ser. No. 08/161,227 filed Dec. 2, 1993, now U.S. Pat. No. 5,433,179 for Improved Rotary Engine with Variable Compression Ratio. In this continuation-in-part, embodiments of the invention are described that are more suitable for engines having large output power.

BACKGROUND—FIELD OF THE INVENTION

This invention relates to internal combustion rotary engines having rotors that move inside a cylindrical cavity with cyclic rotary motion superposed on uniform rotary motion.

BACKGROUND—PRIOR INTERNAL COMBUSTION ENGINES

It is well known that the efficiency of an ordinary internal combustion engine depends on the compression ratio. The higher the compression ratio, the higher will be the efficiency. However, if the compression ratio is too high in an Otto-cycle engine, preignition occurs because of the high temperature produced when the fuel-air mixture is compressed. This not only causes a lowering of efficiency, but can also be damaging to the engine. To avoid preignition when gasoline is used as a fuel, additives such as tetraethyl lead were used for many years; in more recent times tetraethyl lead has been replaced by less toxic additives. Modifications to the shape of the combustion chamber and the location of the ignition plug have made it possible to obtain higher compression ratio in modern Otto-cycle engines compared with earlier ones. The highest compression ratio is obtained by injecting the fuel directly into the cylinder after the air has been compressed as is done in the Diesel-cycle engine. However, these engines are more expensive to manufacture than Otto-cycle engines.

Another possibility of obtaining high efficiency for an internal combustion engine is to expand the hot gasses to a larger volume than the initial volume. This can produce efficiencies comparable to a Diesel-cycle engine but without requiring the heavier parts that are normally required in Diesel-cycle engines. It can only be done with reciprocating-piston engines by the use of turbochargers which use the hot gas leaving the engine to drive a blower or fan that increases the inlet pressure. The increased inlet pressure results in greater power from an engine of given size and can also improve the efficiency because the energy available in the exhaust gas is used to drive the turbocharger. In order to further increase the efficiency, the valve timing and the compression ratio of a turbocharged piston engine can be selected so that the expansion ratio exceeds the compression ratio. This has been called a Miller-cycle engine as noted recently in an article by Normile in Popular Science (Aug. 1993, p.27). However, the turbocharger is costly to make because it must produce high volume and high pressure in order to be effective in the Miller-cycle engine.

In reciprocating-piston engines, the efficiency is maximum only in a limited range of operating speeds. This is partly because the valve timing involves a compromise between efficient operation at low speeds and maximum power output. In addition, because of the inertia of the valves and because they are operated by a camshaft, in order to obtain maximum speed, it has been necessary to use smaller valves and to increase their number to four valves per cylinder, leading to more complex and costly construction.

One of the most serious limitations of the reciprocating-piston engine is that it cannot operate with optimum efficiency using a variety of fuels and atmospheric conditions because the compression ratio cannot be varied.

OBJECTS AND ADVANTAGES OF THE PRESENT INVENTION

The object of this invention is to provide an engine which has the following advantages over reciprocating-piston engines: a) larger intake and exhaust ports, b) no requirement for separate valves and camshaft, c) more uniform torque, d) less vibration, e) higher power-to-weight ratio, f) lower exhaust noise, g) lower exhaust temperature, h) higher overall efficiency, i) high efficiency over a wider range of speeds, j) optimum efficiency with various fuels, and k) higher efficiency over a wider range of atmospheric conditions. The first five of these advantages are inherent advantages of rotary engines over reciprocating-piston engines. The latter six of these advantages are provided specifically by the present invention.

A further object of the present invention is to provide a rotary engine that overcomes the disadvantages of the Wankel rotary engine by having simpler construction, higher thermal efficiency and the possibility of more complete combustion of the fuel.

The present invention is a form of rotary engine that provides maximum efficiency for operation with a variety of fuels and/or can also provide improved efficiency with a given fuel. In contrast to the Miller cycle engine, it does not require a turbocharger in order to have an expansion ratio greater than the compression ratio and it can also have a compression ratio that is variable while the engine is running—a feature that is very difficult to achieve with piston engines.

SUMMARY OF THE INVENTION

Like the previous embodiments of this invention disclosed in U.S. Ser. No. 08/161,227, the rotary engine of the present invention has two interdigitated rotors, each of which has a hub and two vanes. The rotors move in a cylindrical cavity with cyclic rotary motion superposed on uniform rotary motion. A planetary transmission gear with planet gears having half the radius of a fixed sun gear produces this motion through connecting rods that operate cranks connected to the rotors. The rotors are free to rotate relative to each other but are constrained from moving apart by a thrust bearing on a shaft connected to one of the rotors. The two vanes of each of the rotors divide the cylindrical cavity into four chambers whose size changes in such a way that the four cycles of an Otto cycle engine occur in one revolution of the output shaft. A variable compression ratio and an expansion ratio greater than compression ratio is obtained by venting the chamber in which compression occurs to an adjacent chamber by means of a passageway in the rotor housing.

Several embodiments of the present invention are described, having different rotor structures that are suitable for engines of various sizes. In the larger-size engines, it is important that the mass and moment of inertia of the rotors be as small as possible, that the viscous damping forces on the rotors be small and that liquid cooling of the rotor housing be used. Any of the rotor structures described can be used in the basic engine which has greater expansion ratio than compression ratio and variable compression ratio.

DESCRIPTION OF THE FIGURES

FIGS. 10, 10a, 10b, and 10c are drawings of modified rotors that provide higher thermal efficiency.

DETAILED DESCRIPTION OF THE INVENTION

Figures 1A, 1B:
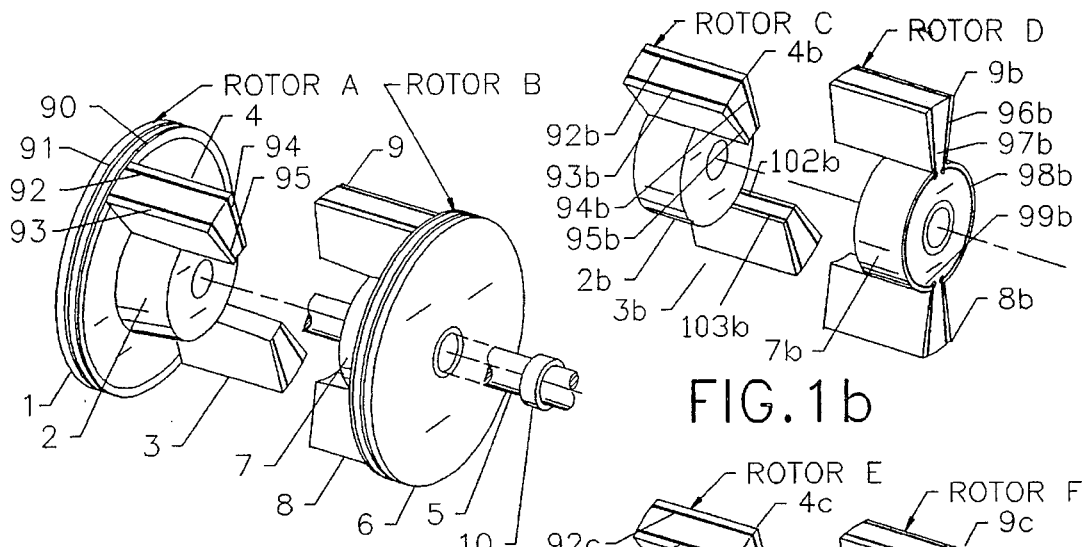
FIGS. 1a, 1b, and 1c are exploded views of three alternative types of rotors used in the rotary engine.

The basic rotary engine is of the so-called cat-and-mouse type which utilizes two rotors connected to a planetary gear drive. In one version, shown in FIG. 1a, the rotors are similar to the rotors described in Drury's U.S. Pat. No. 3,592,571 issued Jul. 13, 1971. Rotor A consists of a circular end plate 1 having a hub 2 and diametrically opposed radial vanes 3 and 4. Similarly, rotor B consists of a circular end plate 6 having a hub 7 and diametrically opposed radial vanes 8 and 9. Rotor A has an axial shaft 5 rigidly attached to it. When the two rotors are interdigitated or nested together, a shaft 5 passes through an axial hole of appropriate size in rotor B so that rotor B is free to rotate about shaft 5. The two rotors seal against each other on their contacting surfaces. The rotor assembly of FIG. 1a differs from the one described by Drury in U.S. Pat. No. 3,592,571 in that a thrust bearing 10 located on shaft 10 constrains rotor B relative to rotor A and prevents the two rotors from moving apart. This is an important element in this embodiment of the present invention, because otherwise, pressure generated between rotor A and rotor B would force the two rotors apart and spoil the seal between them. By the use of this thrust bearing, the seal between rotor A and rotor B becomes independent of the housing in which the rotors are placed, leading to more reliable operation, substantial simplification of the gear transmission system, and the possibility of improved cooling of the rotors compared with other rotary engines described in previous patents.

The rotors of FIG. 1a contain one or more sealing rings such as 90 and 91 located on the circumference of the circular end plates 1 and 6, as well as peripheral sealing strips 92 and 93, and radial sealing strips such as 94 and 95 located on the vanes 3, 4, and 8, 9. In large engines, these sealing strips are required in order to allow for differential thermal expansion of the rotors and the housing in which they are used.

Figure 1C:
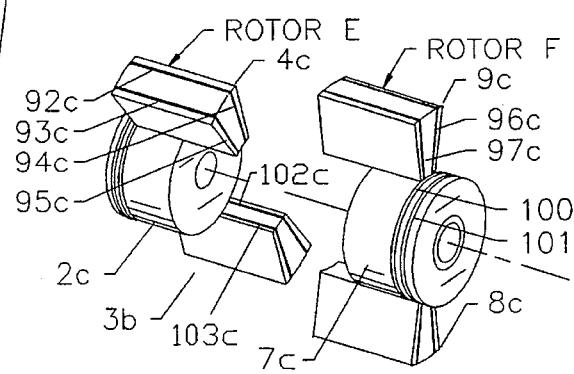

Alternative forms of the rotors are shown in FIG. 1b and FIG. 1c. Each of the rotors in FIG. 1b have a hub 2b (or 7b) and two vanes 3b and 4b (or 8b and 9b). The vanes have peripheral sealing strips, e.g. 92b and 93b, and radial sealing strips, e.g. 94b and 95b. In addition, the distal ends of the vanes contain radial sealing strips, e.g. 96b and 97b, and the distal faces of the hubs contain arcuate sealing strips, e.g. 98b and 99b. Sealing strips 98b and 99b may be connected to strips 96b an 97b by link blocks in a manner as is well known in rotary engine technology.

FIG. 1c shows rotors similar to those shown in FIG. 1b but having hubs 2c and 7c whose distal ends extend beyond the vanes and contain sealing rings such as 100 and 101.

It will be understood by those familiar with similar rotary engines that the [inner partially cylindrical portion of the vanes of the rotors] portion of the vanes which extends over the hub of the mating rotors shown in FIGS. 1a, 1b, and 1c could have sealing strips such as 102b, 103b, in FIG. 1b, or 102c, 103c in FIG. 1c to improve the seal with the hub of the mating rotor. In addition, the proximal face of the hub of one rotor could have arcuate sealing strips like 98b and 99b to improve the seal with the face of the hub of the mating rotor. However, these sealing strips are less important than the ones shown in the Figures because the two rotors would usually be made of the same material and would operate at similar average temperatures.

Alternatively, the hubs of the rotors shown in FIGS. 1b and 1c could be tapered in a manner similar to the hubs shown in FIG. 1a and the seal between the mating surfaces could be maintained by a constraining means or a thrust bearing that allows the rotors to rotate relative to each other but prevents them from moving apart.

Figure 2:
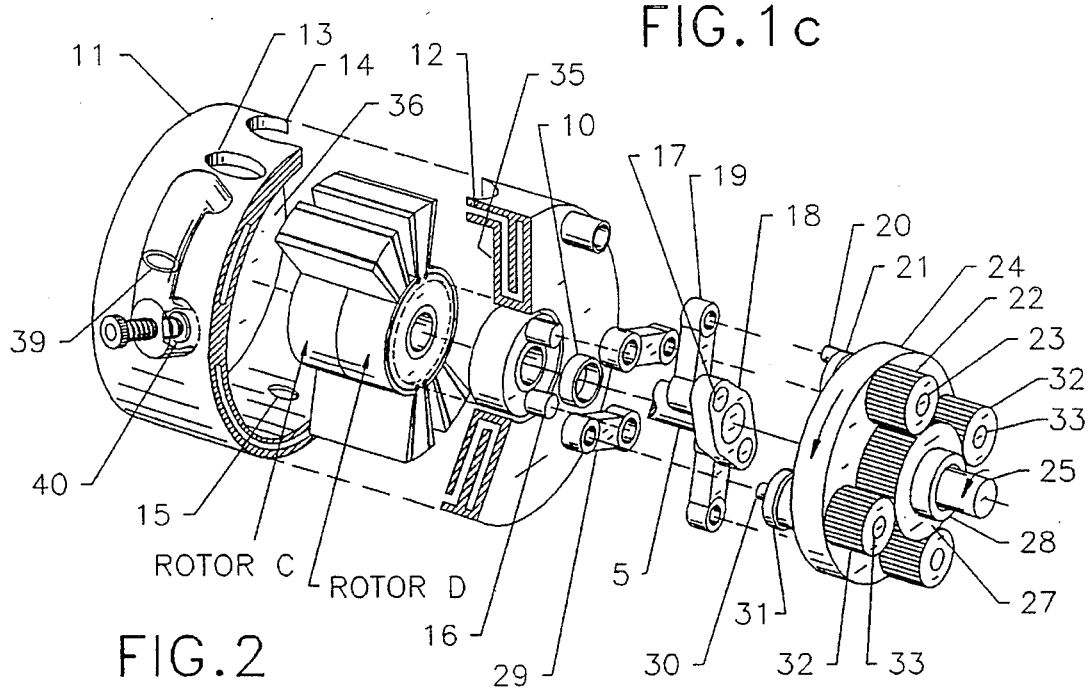
FIG. 2 is a drawing of the rotary engine with planetary gear transmission and variable compression ratio.

FIG. 2 shows one embodiment of the basic rotary engine having high power output. As shown in this Fig. the two interdigitated rotors fit inside a cylindrical housing 11 containing channels 12 for a liquid coolant. The housing 11 contains an intake port 13, an exhaust port 14, and an ignition or fuel injection port 15 located diametrically opposite the intake port 13.

The connection of the rotor assembly to an output gear drive assembly is made by cranks and connecting rods. Rotor C is connected by the shaft 5, which passes through rotor D, to a rotor crank arm 18 containing a crank pin 17. Crank pin 17 drives a connecting rod 19 which turns a crank disk 21 by a crank pin 20. The crank disk 21 is connected to a planet gear 22 by a shaft 23 which is rotatably contained in a planet cage 24. The planet cage 24 is connected to an output shaft 25 which rotates in a bearing (not shown) contained in a gear housing (not shown). Planet gear 22 rolls on a sun gear 27 which has a hub 28 fixed in the gear housing (not shown).

In a similar manner, rotor D has a crank pin 16 eccentrically located relative to the rotor axis forming a second rotor crank arm; this pin is coupled by a connecting rod 29 to a pin 30 on a crank disk 31. Crank disk 31 is connected to a second planet gear 32 by a shaft 33 which is rotatably contained in the planet cage 24. Planet gear 32, like planet gear 22, rolls on the teeth of sun gear 27.

It will be noted that FIG. 2 shows 4 planet gears while only two planet gears suffice to provide the desired motion of the rotors. The two additional planet gears and associated connecting rods shown in this FIG. may be used to provide dynamic balance and greater torque transmission. This point will be addressed in the discussion of FIG. 7.

Operation of the engine is as follows: as the output shaft turns, the planet cage 24 rotates about the sun gear 27. As the planet gears 22 and 32 roll on the sun gear 27, the connecting rods 19 and 29 impart a cyclic angular motion superposed on a uniform rotary motion to the rotors C and D, respectively. Thus, as the rotors turn about their own axis which is coaxial with the output shaft, the vanes 3b and 8b, located on rotors C and D, respectively, move toward and away from each other. Similarly, vanes 4b and 9b on rotors C and D, respectively, move toward and away from each other. The planet gears 22 and 32 have a pitch diameter which is half the pitch diameter of the sun gear 27 so that in one revolution of the output shaft, the vane 3b attached to rotor C and the vane 8b attached to rotor D move toward and away from each other twice. Furthermore, the position where they are closest to each other and farthest from each other remains fixed relative to the cylindrical housing 11.

By suitable choice of the length of the rotor crank arms (U), the length of the crank arms corresponding to the crank disks (V), and the length of the connecting rods 19 and 29 (L), and by having a correct relation between the phase angles of the two crank disks 21 and 31, it is possible to obtain motion of rotor C relative to rotor D so that rotor C is nearly stationary while rotor D is moving and then rotor D slows down and stops while rotor C speeds up. This is the basis for the so-called cat-and-mouse motion. The desired motion in which each of the rotors has a dwell during its motion is obtained by a particular choice of the lengths U, V, and L. In a preferred embodiment, these three lengths have the following approximate range of values: U=0.66R'0.8K, V=1.34R–1.7R, and L=2.25R–2.7R, where R is the pitch radius of the planet gear.

Figure 3:
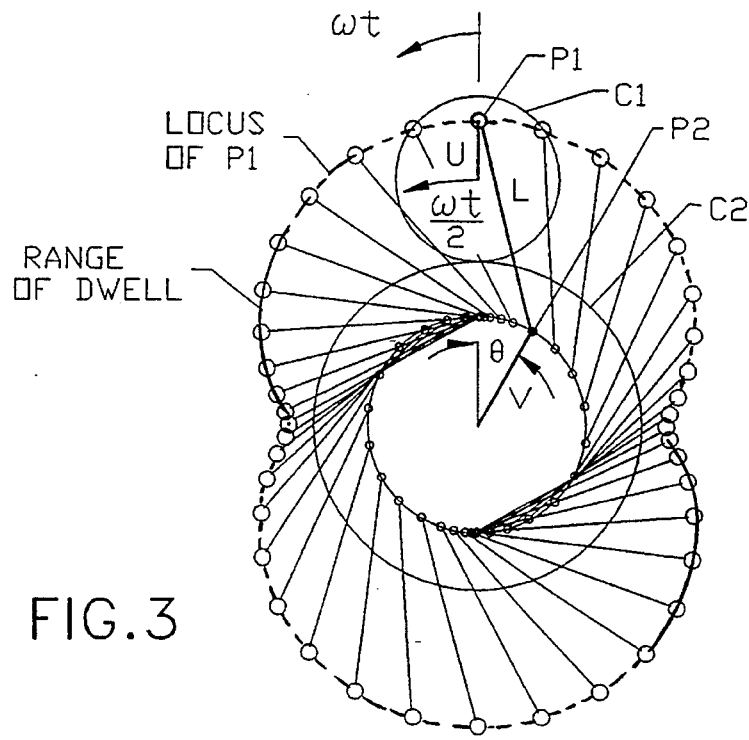
FIG. 3 is a schematic drawing of the kinematics of the planetary gear transmission.
Figure 4A:
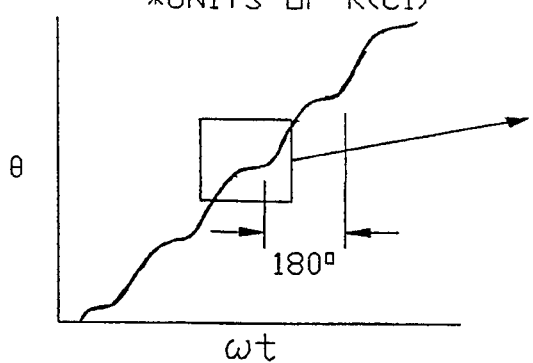
FIG. 4 is a plot of the variation of the rotation angle of one rotor as a function of time.
Figure 4B:
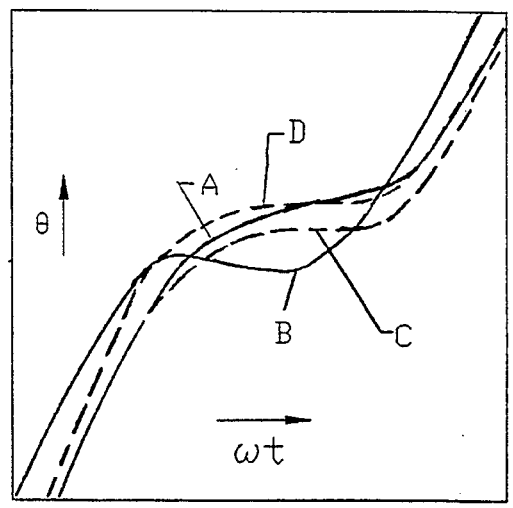

The critical nature of the relative values of the lengths U, V, and L that are required to obtain an appropriate dwell in the motion of the rotor has been overlooked in most of the patent literature on rotary engines with planetary gear transmissions. Hence, details concerning the dwell and the considerations involved in determining suitable values of U, V and L are described here. FIG. 3 shows the motion of a planetary gear transmission having a radius of the sun gear twice the radius of the planet gear. In such a planetary gear transmission, the pitch circle C1 of the planet gear rolls on the pitch circle C2 of the sun gear. The successive positions of the connecting rod L during one revolution of the planet gear about the sun gear are shown at intervals of ωt=π/20 (angular frequency×time). As C1 rolls on C2, the locus of the connecting pin P1 on the disk connected to the planet is an epicycloidal curve. When a portion of this curve can be approximated by a circular arc, a dwell is obtained in the rotor position θ if the rotor crank arm length V has a value such that the center of curvature of the circular arc lies on the circle described by the pin P2 on the rotor crank. A graph of θ vs. ωt which is displayed in FIG. 4 shows that, for a given value of U, if V is too large (curve A) or if L is too large (curve B), there is a poor dwell, i.e. either the rotor creeps forward or backs up. Better choices of V and L give a nearly constant rotor position during the dwell (curves C and D).

Other values for L and V can also provide the desired motion if U is varied. Smaller values of U give a smaller stroke unless L is made larger or V is made smaller. Here, we define the stroke of the vane-type rotary engine as the difference between the maximum angular separation of centerlines of the vanes and the minimum angular separation of these centerlines. This is equal to two times the difference between the maximum and minimum values of θ in a coordinate system rotating with the center of the planet gear. From the law of cosines, the stroke s is given by:

$$s = 2(\theta_{max} - \theta_{min}) = 2\cos^{-1}\left[\frac{9 + V^2 - (L+U)^2}{6V}\right] - 2\cos^{-1}\left[\frac{9 + V^2 - (L-U)^2}{6V}\right]$$

Values of the stroke are given in FIG. 4 for the values of U, V and L used in this Figure. It will be noted that the volumetric displacement of the engine for one revolution of the output shaft can exceed the volume of the cylindrical cavity because there are 4 separate chambers formed by the vanes and two of these chambers have maximum volume when the other two have minimum volume.

A further consideration in the selection of U, V, and L is the vane width. This must not be too narrow; otherwise, it may be difficult to obtain adequate cooling of the vanes or to obtain good sealing between the vanes and housing or between the vanes of one rotor and the circular end plate of the other rotor or the radial walls of the housing. A large stroke is generally desirable, but, because of the motion of one rotor relative to the other rotor, a large stroke may not provide adequate vane width. This may be seen from the following example. Let us assume that the point P2 is symmetrically located relative to a vane, that all vanes are identical, and that the compression ratio is determined only by the maximum and minimum separation of the vanes (actually, the point at which the vanes close the intake port should be taken into account). With these assumptions, the vanes' angular width W is given in terms of the compression ratio c and the stroke s by the following equation:

$W=90-(s/2)(c+1)/(c-1)$ deg.

For curve D of FIG. 4 with s=139.3 deg, if c=8, then w=0.45 deg. Thus, too large a stroke results in too small a vane width. On the other hand, a larger compression ratio, or a smaller stroke as in curve C, would allow a larger vane width.

Finally, one must take into account the strength and inertia of the crank arms and connecting rods. If the connecting rods are too long, or the crank arms are too long, then these parts will have excess inertia and may also be prone to failure by buckling. Thus, there are many factors to be taken into account in the design of the coupling linkage in a planetary gear transmission for a practical rotary engine.

Several of the earlier rotary engines that employed planetary gear transmission systems have failed to take all of the foregoing considerations into account, as evidenced by the figures, specifications or claims in the patents that describe them. For example, the connecting rods were unduly long in the engines described by Kauertz (U.S. Pat. No. 3,144,007 issued Aug. 31, 1964), by Rolfsmeyer (U.S. Pat. No. 3,356,079 issued Dec. 5, 1967), by Howard (U.S. Pat. No. 3,719,438 issued Mar. 6, 1973), and by Shadeck (U.S. Pat. No. 5,147,191 issued Sep. 15, 1992) The crank arm V was also unduly long in the engines described in some of these same patents (e.g. by Kauertz, by Rolfsmeyer, and by Shadeck) and in the planetary transmission of Bullington (U.S. Pat. No. 1,676,211 issued Jul. 3, 1928).

Returning now to FIG. 2, it can be seen that in the embodiment of the invention shown, the rotor assembly is isolated from the gear housing by a partial radial wall 35 and is isolated from the external environment by an exterior radial wall 36. These walls are cooled by liquid flowing in channels, e.g. 12. However, the walls are not required to constrain the axial movement of one rotor relative to the other due to the axial constraint or thrust bearing 10.

The axial load on this constraint would be largest for rotors as shown in FIG. 1a, it would be moderate for rotors as shown in FIGS. 1b and 1c if these rotors had tapered hubs, and it would be least for rotors as shown in FIGS. 1b and 1c if these rotors had cylindrical hubs. Moreover, with the use of distal sealing strips on the rotors as shown in FIGS. 1b and 1c, it is apparent that for any of the rotor configurations described, the tolerance on the spacing of the walls 35 and 36 from each other is not as critical as the tolerance between end walls of the cylindrical cavity in vane-type rotary engines described in some of the previous patents.

Examples of such cases are given by Myard in U.S. Pat. No. 2,072,482 (Mar. 2, 1937), by Kauertz in U.S. Pat. No. 3,144,007 (Aug. 31, 1964), by Sabet in U.S. Pat. No. 3,203,405 (Aug. 31, 1965), by Rolfsmeyer in U.S. Pat. No. 3,356,079 (Dec. 5, 1967), by Leblanc in U.S. Pat. No. 3,396,632 (Aug. 13, 1968), by Drury in U.S. Pat. No. 3,592,571 (Jul. 13, 1971), by Howard in U.S. Pat. No. 3,719,438 (Mar. 6, 1973), by Gotthold in U.S. Pat. No. 3,801,237 (Apr. 2, 1974), by Baer in U.S. Pat. No. 4,068,985 (Jan. 17, 1978), by Sakita in U.S. Pat. No. 5,133,317 (Jul. 28, 1992), and by Schadeck in U.S. Pat. No. 5,147,191 (Sep. 15, 1992). Note that of these patents, only the ones of Rolfsmeyer, Kauretz and Sakita show sealing strips in the drawings.

Figure 6A:
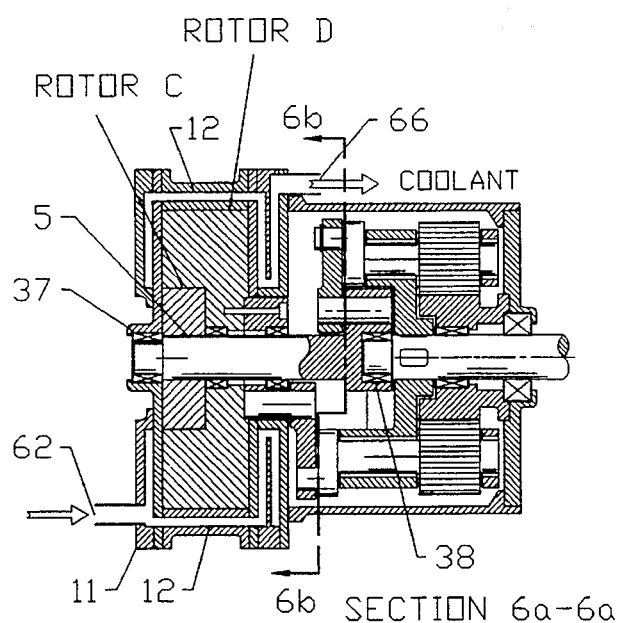
FIGS. 6a and 6b are sectional views showing an engine with liquid cooling means for the engine housing.

Radial forces on the rotors are absorbed by a bearing 38 between the shaft 5 and the output shaft 25 (or planet cage 24), and by a bearing 37 located in the exterior axial wall 36 (refer to FIG. 6a).

Reference numerals 39 and 40 relating to portions of FIG. 2 near the exterior radial wall will be explained in conjunction with FIG. 8b.

Figure 5:
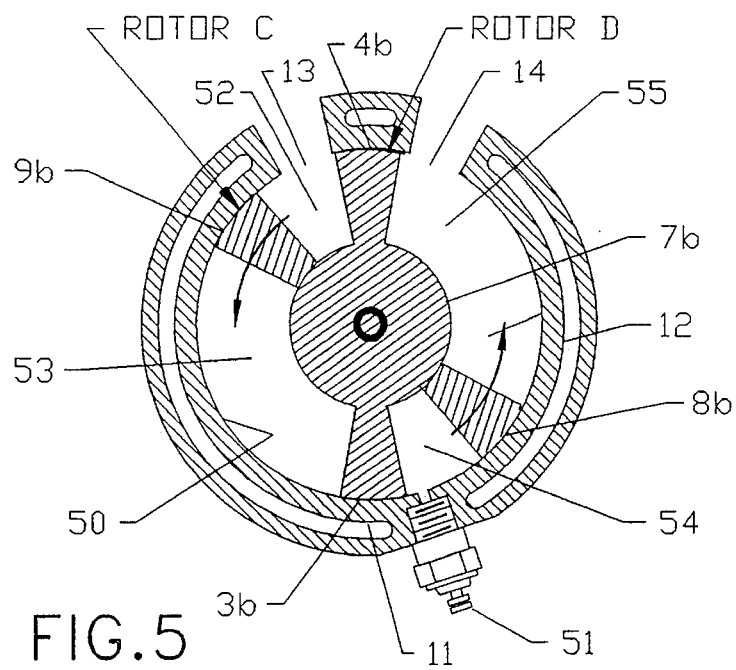
FIG. 5 is a schematic drawing illustrating the operation of the rotary engine.

Operation of the rotary engine as a four stroke cycle engine can be understood by reference to FIG. 5, which schematically shows the rotor vanes located inside the cylindrical housing 11 containing a spark or glow plug 51. While rotor C is moving in a counter-clockwise direction and rotor D is stationary, the inlet port 13 in the housing 11 allows intake of a fuel-air mixture to a portion of the cylindrical cavity 50 bounded by the inside walls of this cavity, vane 4b, vane 9b, hub 2b (not shown), and hub 7b. Let us designate this portion of the cylindrical cavity by chamber 52, with corresponding chambers between vanes 9b and 3b being designated by chamber 53, between vanes 3b and 8b being designated by chamber 54 and between vanes 8b and 4b being designated by chamber 55. While the fuel-air mixture is being taken into chamber 52, a second-fuel air charge previously taken in is being compressed in chamber 53, a third fuel-air charge is expanding after explosion in chamber 54, and a fourth gas charge is being expelled from chamber 55 through the exhaust port 14. After ¼ revolution of the output shaft, vane 9b will be in the position previously occupied by vane 3b, vane 3b in the position previously occupied by vane 8b, and vane 8b in the position previously occupied by vane 4b. With further rotation of the output shaft, the process repeats itself four times for each revolution. Thus, in one revolution of the output shaft, there are four complete Otto cycles, one Otto cycle taking place in each of the four chambers. The rotary engine behaves in the same manner as a piston engine of the four stroke cycle type having four cylinders and with its output geared down by a 2/1 ratio. Of course, it is also possible to obtain operation similar to the four strokes of a Diesel cycle engine if only air is admitted through port 13 and if the ignition plug 51 is replaced with a fuel injector.

Since the number of power strokes per revolution of the output shaft is four, the torque transmitted to the output shaft is distributed as if the engine had eight cylinders with the result of very smooth running, less vibration, and more compact size than conventional reciprocating-piston engines of the same power output. These advantages are well known for rotary engines, for example, as taught in Drury's U.S. Pat. No. 3,592,571 (Jul. 13, 1971), and also described by articles in Popular Science (January, 1967, pp 80–85), and Scientific American (vol. 220, 1969, p 90).

DETAILS CONCERNING VARIOUS EMBODIMENTS OF THE INVENTION

Engine with liquid cooling means

Figure 6B:
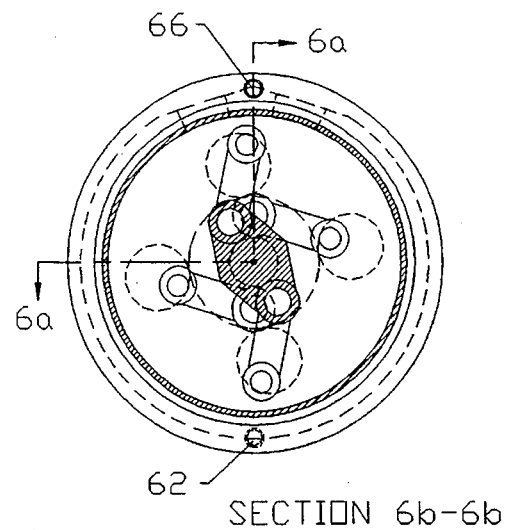

This embodiment may be understood by reference to FIGS. 5, 6a and 6b. In FIGS. 6a and 6b, some parts are shown that are similar to those shown in FIG. 2, particularly with respect to the gear transmission system. The object of this embodiment of the invention is to provide liquid cooling of the housing. This is important in large versions of the engine because air cooling depends on the surface area which increases as the linear dimensions while the power output increases as the cube of the linear dimensions. Due to the compact size of combustion chamber of the rotary engine, air cooling is not practical for large engines.

FIGS. 6a and 6b show an inlet port 62 and an outlet port 66 for liquid coolant that flow thorough channels 12 in the housing 11. The rotors shown for illustration are of the type shown in FIG. 1b. However, it is apparent that rotors of the type shown in FIGS. 1a or 1c, or other similar rotors could be used.

Engine with balanced planetary gear drive

Figure 7:
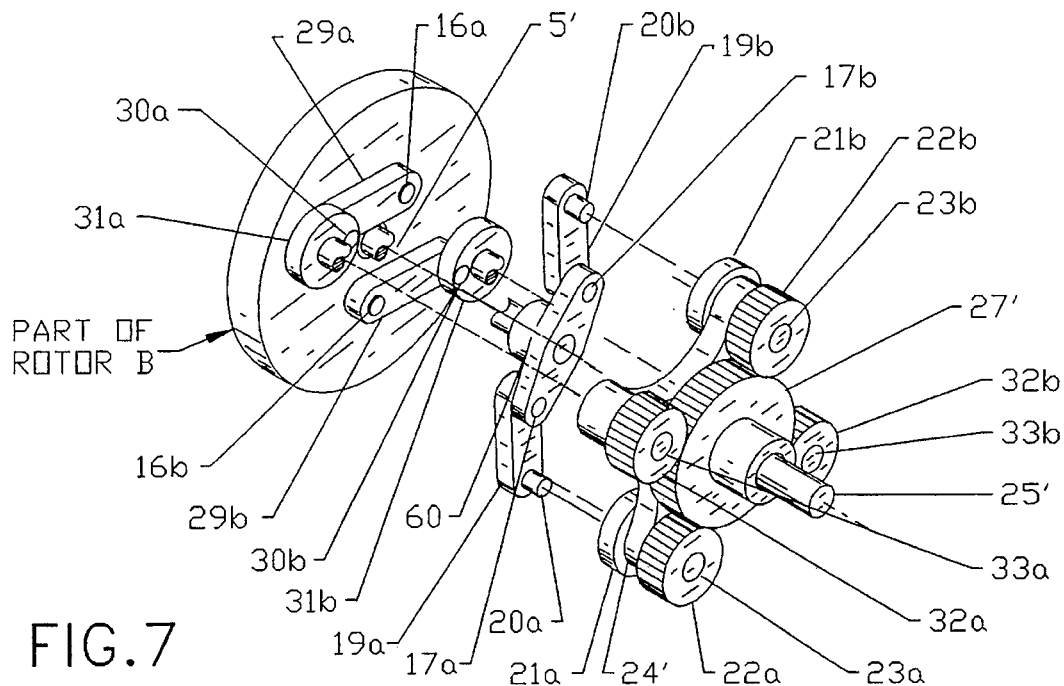
FIG. 7 shows a planetary gear drive comprised of one sun gear and four planet gears for dynamic balance.

The preferred form of planetary gear transmission system for the present invention is shown in FIG. 7. This Figure shows a balanced gear transmission system with four planetary gears and a single sun gear. In this Figure, based on rotors of the type shown in FIG. 1a, letter designations follow numbers to indicate the similarity with corresponding parts of the gear transmission shown in FIG. 2. Letters a and b are used following numerals to denote similar parts on the same drawing. In this transmission system, a crank 60 connected to rotor A by a shaft 5' has two diametrically opposed arms containing two crank pins 17a and 17b that engage two connecting rods 19a and 19b. These connecting rods drive separate crank disks 21a and 21b through two pins 20a and 20b. The crank disks 21a and 21b are connected to two diametrically opposed planet gears 22a and 22b by two shafts 23a and 23b. The planet gears 22a and 22b roll about a sun gear 27'. Rotor B has two diametrically opposed crank pins 16a and 16b that engage two connecting rods 29a and 29b. These connecting rods couple with two crank pins 30a and 30b on separate crank disks 31a and 31b. The crank disks drive diametrically opposed planet gears 32a and 32b via separate shafts 33a and 33b. In this balanced drive, the planet gears 22a and 22b are located at an angular position 90 degrees from the planet gears 32a and 32b about the axis of the planet cage 24'. It can be seen from FIG. 7 that entire gear transmission has nearly perfect axial symmetry about the drive shaft. This not only provides for less vibration and higher operating speeds but also provides better balance of forces and the possibility of greater power transmission due to the doubling of the number of planet gears, crank disks, connecting rods and pins.

Engine with expansion ratio greater than compression ratio and variable compression ratio In this embodiment of the invention, the size of the volume of gas which is compressed is made different from the size of the volume to which the gas expands after explosion, thereby providing higher efficiency.

First, we note that the smaller intake of gas can be accomplished in principle just by changing the intake port size or changing the intake port position while keeping the exhaust port fixed. However, it is not easy to change these parameters while the engine is in operation. Moreover, just simply changing these parameters can result in difficulties in achieving proper functioning of the carburetor, i.e. the flow of air through the carburetor will be too small, too large, too irregular, or may even reverse direction. For example, if one uses an arrangement similar to that described in U.S. Pat. No. 4,068,985, issued to Baer Jan. 17, 1978, the intake port could be displaced in the direction of rotation of the rotors. However, if this is done, it may be seen from FIG. 5 that as rotor C moves while rotor D is nearly stationary, at first, a partial vacuum will result behind vane 9b. Then, as vane 9b passes the new intake port position, there will be a sudden flow into this partial vacuum. When rotor C becomes stationary and rotor D begins to move, there will be a tendency for the gas to flow back through the intake port which may cause reverse flow in the carburetor. What is required is a controlled flow of gas back from chamber 53 to chamber 52 in FIG. 5. In the present invention, this is accomplished in two different ways which will be called "vented compression", and "controlled vented compression".

Figure 8A:
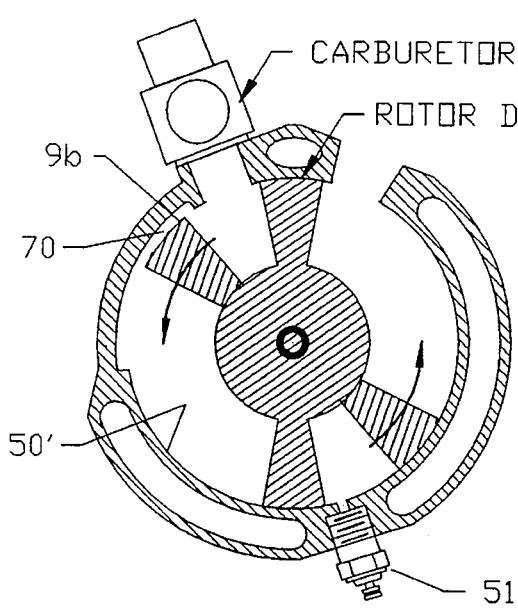
FIGS. 8a and 8b are drawings which show different forms of the engine that have an expansion ratio greater than compression ratio.

Vented compression is accomplished in the manner shown in FIG. 8a. The intake side of the rotary engine is provided with a duct or passageway 70 whose size is large enough for the fuel-air mixture gas to flow back to the intake chamber from the compression chamber without excess resistance, but not so large that gas flows readily back into the carburetor. This is important because for a rotary engine the carburetor can be mounted close to the intake port because an intake manifold is not required. The passageway 70 may be a clearance channel between the rotors and the cavity 50' as shown in FIG. 8a or it may be contained within the cylindrical housing and/or the exterior wall 36. Alternative, passageway can be contained in an assembly attached to the housing as illustrated by the duct 39 in FIG. 2.

Figure 8B:
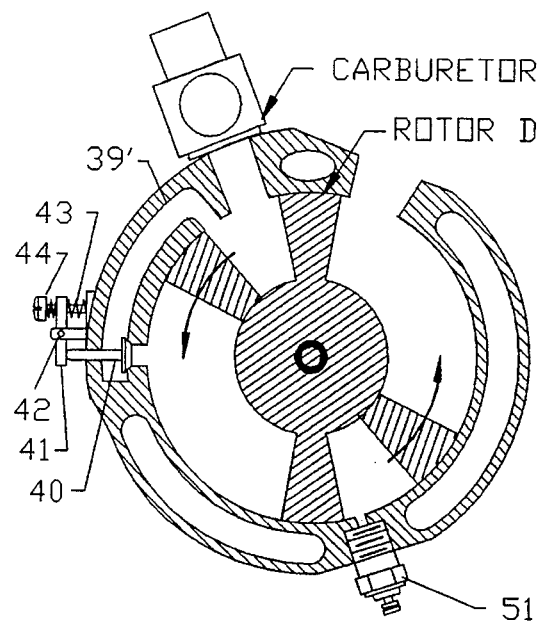

Controlled vented compression, which is the preferred form of this embodiment, is accomplished in the manner shown in FIG. 8b. Similar to FIG. 8a, there is a passageway 39' extending annularly around the cylindrical rotor housing or partly through the external radial wall 36 of FIG. 2. This passageway is provided with a one-way, pressure-activated control element, this is shown for purposes of illustration in FIG. 8b as a popper valve 40 contacting a rocker arm 41 supported by a pivot 42 and loaded by a spring 43. (An alternative form is shown schematically in FIG. 2 with only the poppet valve specifically designated). The valve 40 may remain closed when the engine is running at high speed because air cannot flow fast enough into the intake to provide complete induction. However, at moderate speeds and especially when accelerating from low speeds, as compression takes place, the gas pressure builds up high enough to open the valve 40 and prevent over-compression which would result in preignition.

The base compression ratio (i.e. the compression ratio for no venting) is the same as the expansion ratio. By suitable design of the rotors this base compression ratio is made greater than the compression ratio normally used in reciprocating piston engines, for example, 18/1. Thus, if vented compression occurs by opening of valve 40 when the pressure in chamber 53 is one atmosphere, the compression ratio could be reduced to 9/1 while the expansion ratio remains fixed at 18/1.

In FIG. 8b, a screw 44 is used to adjust the spring force on the poppet valve 40 so that the compression ratio can be varied in order to accommodate various grades of gasoline or various alternate fuels. For example, a higher spring pressure would cause the poppet valve to remain closed longer and the compression ratio could be made higher. In this way, the same engine can be operated to produce high torque and high efficiency with various fuels having a different tendency for preignition, e.g. hydrogen, compressed natural gas, propane, methanol, etc.

The use of a pressure-sensitive valve has another valuable feature, namely, it provides automatic compensation for changes in atmospheric pressure. This is important for application to automobiles driven in mountainous countries or to small aircraft because the atmospheric pressure can change by as much as 12 percent from sea level to 5,280 feet and 21 percent from sea level to 10,360 feet. In some versions of this embodiment of the invention, the poppet valve may have its spring tension varied by means of a solenoid or a servo motor (not shown) so that the this spring tension can be varied by a microprocessor having input from appropriate sensors for temperature, pressure, speed, chamber pressure, exhaust emissions or other engine parameters. Alternatively, the spring could be eliminated and the valve position can be controlled completely by a microprocessor that receives signals from appropriate sensors and causes the valve to move by means of a servo or a solenoid.

Figure 9A:
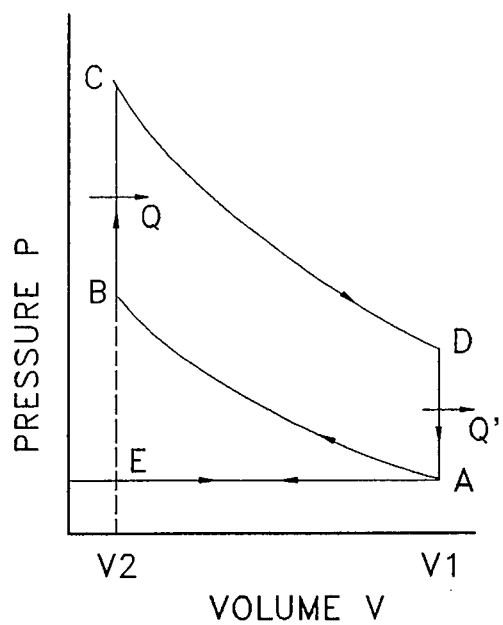
FIGS. 9a and 9b are idealized pressure-volume curves for two different types of internal combustion engine cycles; namely, a) the Otto cycle and b) the cycle which is the basis for the present invention.

The principle of operation of the vented compression engines may be described in terms of a thermodynamic cycle similar to the Otto cycle. The idealized Otto cycle is described in thermodynamic texts such as the one written by Zemansky ("Heat and Thermodynamics", McGraw Hill Book Co, 1943, pp 120–123). Such an idealized Otto cycle is shown in FIG. 9a (note that in this Figure there is a non-linear scale on the vertical axis). The air-standard ideal Otto cycle assumes air as the working medium and consists of five steps which are listed as follows:

1. E–A represents a quasistatic isobaric intake of air at atmospheric pressure.
2. A–B represents a quasistatic, adiabatic compression of $n_1$ moles of air
3. B–C represents a quasistatic, isovolumic increase of temperature and pressure brought about by absorption of the heat of combustion Q.
4. C–D represents a quasistatic, adiabatic expansion of $n_1$ moles of air.
5. D–A represents a quasistatic, isovolumic drop in temperature and pressure brought about by rejection of heat Q'.
6. A–E represents a quasistatic, isobaric exhaust at atmospheric pressure.

Figure 9B:
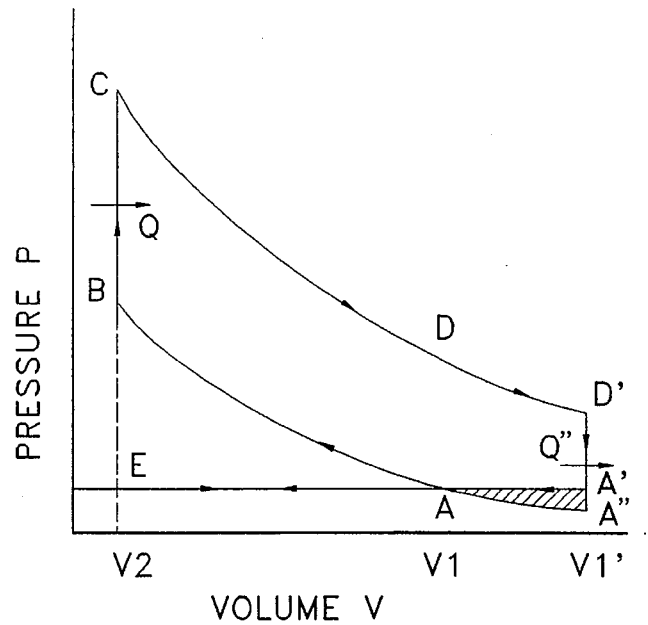

In FIG. 9b, showing the cycle used in this embodiment of the invention, instead of exhaust taking place at V1, the expansion continues to V1'. Then at V1' a quasistatic, isovolumic drop in temperature and pressure occurs (D'—A'), followed by quasistatic isobaric exhaust at atmospheric pressure (A'—E). If the Otto cycle is imagined to be continued to the point A", a closed loop similar to the Otto cycle is obtained. Furthermore, if the shaded area in the P–V diagram is negligible compared to the area DD'AA', the work done and heat exchange corresponding to this shaded area is also negligible. Hence, to a first approximation, the ideal cycle of this invention gives a theoretical efficiency that is equal to the efficiency of an Otto cycle with a compression ratio of V1'/V2 instead of V1/V2.

The theoretical efficiency of an Otto cycle engine is given by:

$$e = 1 - 1/(r)^{\gamma-1}$$

where r is the compression ratio and $\Gamma$ is the ratio of specific heat at constant pressure to the specific heat at constant volume. Assuming $\gamma=1.4$ and V1/V2=8 the theoretical efficiency would be approximately 56.5%. But if V1'/V1=2, then the theoretical efficiency would be approximately 67%, an increase of about 18.6%.

A more accurate theoretical treatment of the engine cycle having an expansion ratio that exceeds the compression ratio is given in the book by Richard Stone "Introduction to Internal Combustion Engines," published by the Society of Automotive Engineers in 1993, pages 50–54. Such a cycle is sometimes called a modified Atkinson cycle after Atkinson who built an engine in 1885 that used this cycle (see "Combustion Engine Processes" by Lester Lichty, McGraw Hill Book Company, 1967, pp 10–11).

Further rotor modifications for improved efficiency

As with reciprocating-piston engines, the compression ratio that may be used without preignition depends on the detailed shape of the compressed gas at the time of ignition and on the turbulence of this gas. Simple plane faces on the rotor vanes will provide less optimum performance than more complicated shapes.

Figure 10:
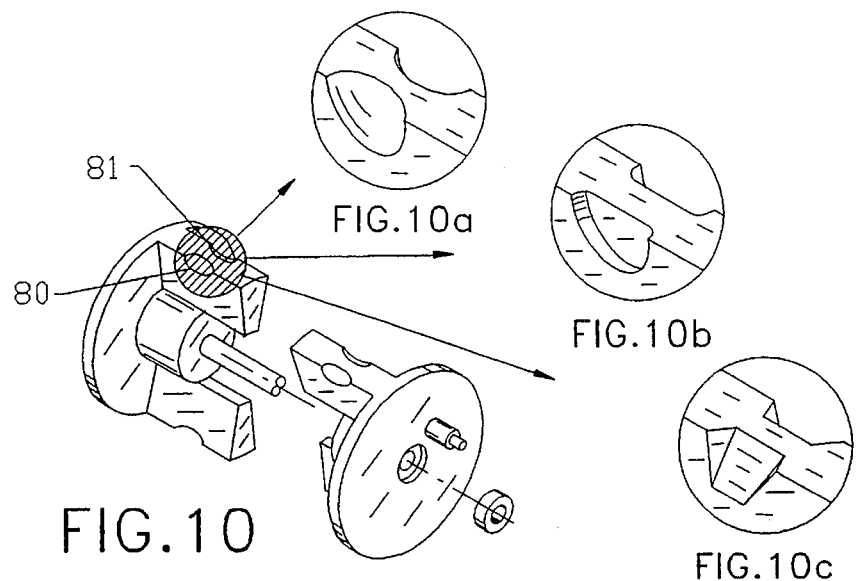

FIG. 10 shows three forms of modified rotor shape that will provide improved performance of this invention. Although this Fig. shows modifications to rotors of the type shown in FIG. 1a, it will be appreciated that these modifications could also apply to rotors of the type shown in FIGS. 1b and 1c. The edges of each rotor vane where the cylindrical surface contacts the radially directed planar face has two cavities 80 and 81. The surface of each of the cavities has a shape that is a portion of an ellipsoid, diskoid, or prismoid as shown in FIG. 10a, 10b, and 10c respectively. Because of these cavities, when the vanes of rotor A are in closest proximity to the vanes of rotor B, a combustion chamber is formed whose shape is determined by the shape of these cavities provided the angular width of the vanes is selected so that the planar faces of the vanes almost touch when ignition occurs. Thus, the initial shape of the combustion chamber has small ratio of surface area to volume and the thermal efficiency is improved.

SUMMARY AND RAMIFICATIONS

It should be apparent that the invention described in this specification accomplishes all of the objectives of providing an engine that is superior to existing engines because it has the following attributes: a) larger intake and exhaust ports, b) no requirement for separate valves and camshaft, c) more uniform torque, d) less vibration, e) higher power-to-weight ratio, f) lower exhaust noise, g) lower exhaust temperature, h) higher overall efficiency, i) high efficiency over a wider range of speeds, j) optimum efficiency with various fuels, k) higher efficiency over a wider range of atmospheric conditions, l) simpler construction, m) higher thermal efficiency and n) the possibility of more complete combustion. As the supply of fossil fuel diminishes and the problems of air pollution continue to degrade the environment, it will become increasingly important to utilize engines of higher efficiency that can also operate on alternate fuels.

It must be remembered that early Otto-cycle engines were extremely inefficient and produced exhaust rich in polluting emissions. Since the introduction of the reciprocating-piston Otto-cycle engine, 115 years of development have taken place and this engine is undoubtedly reaching the limit of its capabilities. In contrast, rotary engines of all types are in their infancy. It is expected that the rotary engine described herein will overcome the barrier that has existed in making improved engines of the rotary type.

While the above description contains many specifications, these should not be construed as limitations of the scope of the invention but as examples of some preferred embodiments. Thus, the scope of the invention should be determined not by the embodiments described but by the appended claims.

I claim:

1. An improved rotary engine comprising:
    a) a housing having a cylindrical cavity with radially directed end walls, a cooling means, and inlet and outlet ports terminating in said cavity,
    b) two interdigitated rotors rotatably movable in said cylindrical cavity, each of said rotors having a hub, and two radial vanes, said vanes of the first of said rotors extending over the hub of the second of said rotors so that a seal is formed between the first said rotor and the second said rotor and between said rotors and said housing, whereby the cylindrical cavity is divided into four compartments,
    c) a duct or passageway connecting a first of said compartments with a second of said compartments whereby gas can flow from the first said compartment to the second said compartment.

2. An engine as described in claim 1 in which said duct or passageway contains a pressure-activated structure permitting said gas to move from the first compartment to the second compartment only when the pressure in the first said compartment exceeds a preselected value.

3. An engine as described in claim 2 wherein said pressure-activated structure comprises an adjustment structure for changing said preselected value while the engine is in operation.

4. An engine as described in claim 1 in which the first said rotor has a rotor shaft movably passing through an axial hole in the second said rotor, said rotor shaft having at least one crank arm and crank pin, the second said rotor having at least one crank pin mounted eccentrically with respect to the axis of the rotor and forming a crank of substantially the same length as the crank arm on said shaft.

5. An engine as described in claim 4 having an output gear drive comprising a planet gear cage attached to an output shaft rotatably mounted in said housing coaxially with the axis of said cylindrical cavity, said planet gear cage containing at least two planet gears, each of said planet gears being mounted on rotatable planet gear shafts having crank arms, and said planet gears rotating about a sun gear that is fixed and coaxial relative to said housing, a coupling structure between each of said crank pins and crank arms on each of said planet gear shafts in said planet gear cage whereby motion of said planet gears about said sun gear imparts oscillatory angular motion superposed on uniform angular motion to each of said rotors.

6. An engine as described in claim 5 in which said output gear drive has four planet gears, two of said planet gears forming a pair which is coupled to the first said rotor and the other two forming a pair which is coupled to the second said rotor, with the two said gears making up each said pair being symmetrically located about the axis of the said sun gear so that dynamic balance is achieved.

7. An engine as described in claim 5 containing an ignition means located in said cylindrical housing substantially opposite said intake port.

8. An engine as described in claim 5 containing a fuel injection means located in said cylindrical housing substantially opposite said intake port.

9. An engine as described in claim 1 in which said vanes have ellipsoidal cavities on edges proximal to said cylindrical cavity whereby the combustion chamber formed by said vanes of the first said rotor and the said vanes of the second said rotor has reduced surface area for greater thermal efficiency.

10. An engine as described in claim 1 in which said vanes have discoidal cavities on edges proximal to said cylindrical cavity whereby the combustion chamber formed by said vanes of the first said rotor and the said vanes of the second said rotor has reduced surface area for greater thermal efficiency.

11. An engine as described in claim 1 in which said vanes have prismoidal cavities on edges proximal to said cylindrical cavity whereby the combustion chamber formed by said vanes of the first said rotor and the said vanes of the second said rotor has reduced surface area for greater thermal efficiency.

12. An improved rotary engine comprising:
 a) a housing having a cylindrical cavity with radially directed end walls, a cooling means, and inlet and outlet port terminating in said cavity,
 b) two interdigitated rotors rotatably movable in said cylindrical cavity, each of said rotors having a hub, and two radial vanes, said vanes of the first of said rotors extending over the hub of the second of said rotors so that a seal is formed between the first said rotor and the second said rotor whereby the cylindrical cavity is divided into four compartments,
 c) one or more sealing strips on the periphery of said vanes, said sealing strips making contact with the cylindrical wall of said cavity and maintaining the seal between said vanes and said cylindrical wall,
 d) a duct or passageway connecting a first of said compartments with a second of said compartments whereby gas can flow from the first said compartment to the second said compartment.

13. An engine as described in claim 12 in which said duct or passageway contains a pressure-activated structure permitting said gas to move from the first compartment to the second compartment only when the pressure in the first said compartment exceeds a preselected value.

14. An engine as described in claim 13 wherein said pressure-activated structure comprises an adjustment structure for changing said preselected value while the engine is in operation.

15. An engine as described in claim 12 in which the first said rotor has a rotor shaft movably passing through an axial hole in the second said rotor, said rotor shaft having at least one crank arm and crank pin, the second said rotor having at least one crank pin mounted eccentrically with respect to the axis of said rotor and forming a crank of substantially the same length as the crank arm on said shaft.

16. An engine as described in claim 15 having an output gear drive comprising a planet gear cage attached to an output shaft rotatably mounted in said housing coaxially with the axis of said cylindrical cavity, said planet gear cage containing at least two planet gears, each of said planet gears being mounted on rotatable planet gear shafts having crank arms, and said planet gears rotating about a sun gear that is fixed and coaxial relative to said housing, a coupling structure between each of said crank pins and crank arms on each of said planet gear shafts in said planet gear cage whereby motion of said planet gears about said sun gear imparts oscillatory angular motion superposed on uniform angular motion to each of said rotors.

17. An engine as described in claim 16 in which said output gear drive has four planet gears, two of said planet gears forming a pair which is coupled to the first said rotor and the other two forming a pair which is coupled to the second said rotor, with the two said gears making up each said pair being symmetrically located about the axis of the said sun gear so that dynamic balance is achieved.

18. An engine as described in claim 16 containing an ignition means located in said cylindrical housing substantially opposite said intake port.

19. An engine as described in claim 16 containing a fuel injection means located in said cylindrical housing substantially opposite said intake port.

20. An engine as described in claim 12 in which said vanes have ellipsoidal cavities on edges proximal to said cylindrical cavity whereby the combustion chamber formed by said vanes of the first said rotor and the said vanes of the second said rotor has reduced surface area for greater thermal efficiency.

21. An engine as described in claim 12 in which said vanes have discoidal cavities on edges proximal to said cylindrical cavity whereby the combustion chamber formed by said vanes of the first said rotor and the said vanes of the second said rotor has reduced surface area for greater thermal efficiency.

22. An engine as described in claim 12 in which said vanes have prismoidal cavities on edges proximal to said cylindrical cavity whereby the combustion chamber formed by said vanes of the first said rotor and the said vanes of the second said rotor has reduced surface area for greater thermal efficiency.

23. An engine as described in claim 12 in which said hubs are tapered.

24. An engine as described in claim 15 in which said hubs are tapered and said shaft contains an antifriction thrust bearing whereby the axial play between said rotors may be preset but further axial motion of said rotors away from each other is inhibited while rotary motion of said rotors relative to each other is facilitated.

25. An engine as described in claim 12 wherein each of said rotors have at one end a disk of substantially the same radius as that of said vanes, said disk having one or more sealing rings on its periphery.

26. An engine as described in claim 12 wherein each of said vanes have radially directed sealing strips on their ends.

27. An engine as described in claim 12 wherein the ends of each of said hubs most distant from said hub of the second said rotor have arcuate sealing strips to improve the seal between said rotors and said radial walls.

28. An engine as described in claim 12 wherein the hub of each of said rotors extends beyond the vanes in the distal direction and contains one or more sealing rings.

29. An engine as described in claim 12 wherein each of said vanes of said rotors have sealing strips embedded in the portion of said vanes which are in closest proximity to the convex surface of said hub of the other said rotor to improve the seal between each of said vanes and said hub of the other said rotor.

* * * * *